United States Patent
Serizawa

(10) Patent No.: US 11,239,733 B2
(45) Date of Patent: Feb. 1, 2022

(54) METHOD OF MANUFACTURING REACTOR

(71) Applicant: TOYOTA JIDOSHA KABUSHIKI KAISHA, Toyota (JP)

(72) Inventor: Kazumi Serizawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 135 days.

(21) Appl. No.: 16/823,730

(22) Filed: Mar. 19, 2020

(65) Prior Publication Data

US 2020/0321841 A1 Oct. 8, 2020

(30) Foreign Application Priority Data

Apr. 8, 2019 (JP) .............................. JP2019-073755

(51) Int. Cl.
*H02K 15/04* (2006.01)
*H02K 3/28* (2006.01)

(52) U.S. Cl.
CPC ............. *H02K 15/045* (2013.01); *H02K 3/28* (2013.01)

(58) Field of Classification Search
CPC ................................ H05K 3/28; H05K 15/045
See application file for complete search history.

(56) References Cited

U.S. PATENT DOCUMENTS

2006/0028074 A1* 2/2006 Komura .................... H02K 3/24
310/61
2020/0098502 A1 3/2020 Serizawa

FOREIGN PATENT DOCUMENTS

| JP | 4946775 B2 | * | 6/2012 |
| JP | 2015-228476 A | | 12/2015 |
| JP | 2016-092313 A | | 5/2016 |
| JP | 2016092313 A | * | 5/2016 |
| JP | 2020-53666 A | | 4/2020 |
| WO | 2018105958 A1 | * | 6/2018 |

* cited by examiner

*Primary Examiner* — Carl J Arbes
(74) *Attorney, Agent, or Firm* — Sughrue Mion, PLLC

(57) ABSTRACT

A method of manufacturing a reactor is provided. The reactor include: a coil including a wound flat wire, the flat wire being covered with an insulating film, and the coil having a flat surface; and a cooler facing the flat surface, in which the flat wire on an outer periphery side of the coil may be not covered with the insulating film at the flat surface, and the flat wire at the flat surface may include a plurality of wire segments lying in a pitch direction. The method may include pressing a rod against a short side of the plurality of wire segments to form at least one thickened portion in each of the plurality of wire segments, the thickened portion being a portion of the flat wire thickened in the pitch direction.

5 Claims, 8 Drawing Sheets

METHOD OF MANUFACTURING REACTOR

CROSS-REFERENCE

This application claims priority to Japanese Patent Application No. 2019-073755, filed on Apr. 8, 2019, the entire contents of which are incorporated herein by reference.

TECHNICAL FIELD

The technology herein disclosed relates to a method of manufacturing a reactor. Specifically, the technology relates to a method of manufacturing a reactor that includes a coil including a wound flat wire, in which the coil has a flat surface and a cooler faces the flat surface.

BACKGROUND ART

A reactor that includes a coil including a flat wire wound into a prism shape, in which the coil has a flat surface, and a cooler faces the flat surface is known. For example, in a reactor of Japanese Patent Application Publication No. 2016-092313, a flat wire that constitutes a coil is covered with an insulating film so as not to be short-circuited to the flat wire adjacent in a pitch direction. Meanwhile, when the flat wire is covered with the insulating film, heat-transfer efficiency from the coil to the cooler decreases. The flat wire on an outer periphery side of the coil is therefore not covered with the insulating film at the flat surface of the coil that faces the cooler.

SUMMARY

In the reactor of Japanese Patent Application Publication No. 2016-092313, the flat wire on the outer periphery side of the coil is not covered with the insulating film at the flat surface of the coil that faces the cooler, so as to enhance the heat-transfer efficiency from the coil to the cooler. However, there is a risk that if the flat wire is tightly wound in the pitch direction, adjacent wire segments (wire segments of the flat wire) would contact each other, resulting in a short circuiting between portions not covered with the insulating film. The present specification discloses a technology of maintaining an appropriate distance between wire segments of a flat wire adjacent in a pitch direction of a coil.

The present specification discloses a method of manufacturing a reactor. The reactor may include a coil and a cooler. The coil may include a wound flat wire covered with an insulating film. The coil may include a flat surface. The cooler may face the flat surface. The flat wire on an outer periphery side of the coil may be not covered with the insulating film at the flat surface. In the present specification, a part of the flat wire of the coil is termed a "wire segment". The flat wire at the flat surface of the coil may include a plurality of wire segments lying in a pitch direction. The manufacturing method herein disclosed may comprise pressing a rod against a short side of the plurality of wire segments on an inner periphery side of the coil to form at least one thickened portion in each of the plurality of wire segments, and the thickened portion is a portion of the flat wire thickened in the pitch direction.

DETAILED DESCRIPTION

Figure 1:
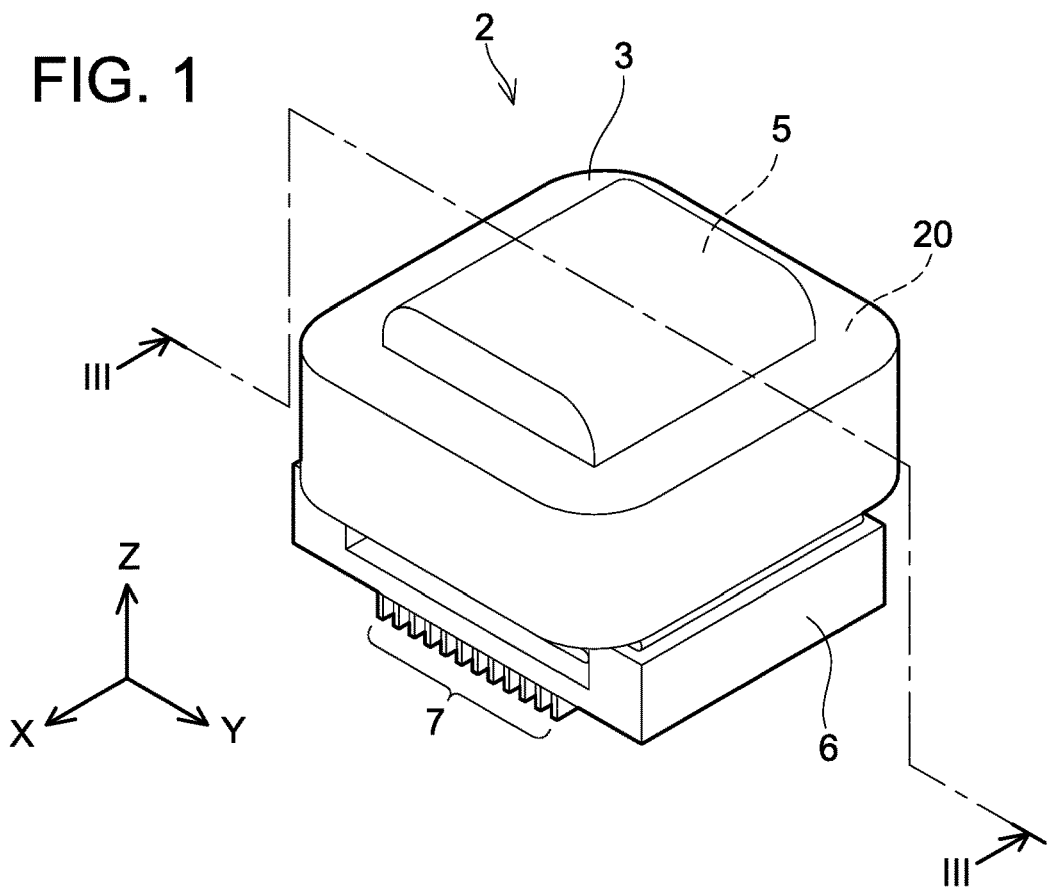
FIG. 1 is a perspective view of a reactor manufactured with a manufacturing method according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved methods of manufacturing reactors, as well as methods for using and manufacturing the same.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiments will herein be listed. It should be noted that the respective technical elements are independent of one another, and are useful solely or in combinations. The combinations thereof are not limited to those described in the claims as originally filed.

This specification discloses a method of manufacturing a reactor. The reactor may comprise: a coil comprising a wound flat wire, the flat wire being covered with an insulating film, and the coil having a flat surface; and a cooler facing the flat surface, in which the flat wire on an outer periphery side of the coil may be not covered with the insulating film at the flat surface, and the flat wire at the flat surface may include a plurality of wire segments lying in a pitch direction. The method may comprise pressing a rod against a short side of the plurality of wire segments on an inner periphery side of the coil to form at least one thickened portion in each of the plurality of wire segments, the thickened portion being a portion of the flat wire thickened in the pitch direction.

In the above-described method of manufacturing the reactor, the thickened portion, which is a portion of the flat wire thickened in the pitch direction, is formed in each of the wire segments, such that the thickened portion contacts the wire segment(s) adjacent thereto in the pitch direction. Since the rod is pressed against the short side of the wire segments on the inner periphery side of the coil, the thickened portion is formed on the inner periphery side of the coil. Since the wire segments are covered with the insulating film on the inner periphery side of the coil, insulation between the adjacent wire segments is ensured even when the adjacent wire segments contact each other. Meanwhile, except for the thickened portions, the wire segments adjacent in the pitch direction are apart from each other. Clearance is ensured between the adjacent wire segments on the outer periphery side of the coil. This can suppress the adjacent wire segments on the outer periphery side of the coil which are not covered with the insulating film from contacting each other, and thus avoid a short circuit.

In the method disclosed herein, the at least one thickened portion may include a plurality of thickened portions. The plurality of thickened portions may be formed in at least one of the plurality of wire segments. Such a configuration allows the wire segments adjacent in the pitch direction to contact each other at a plurality of spots. The adjacent wire segments may therefore be held substantially parallel.

In the method disclosed herein, the at least one thickened portion in each of the plurality of wire segments may be at a different position from the at least one thickened portion in an adjacent wire segment when viewed along an axial direction of the coil. Such a configuration keeps the thickened portions respectively provided in the wire segments adjacent in the pitch direction from contacting each other. In each thickened portion, deformation of the wire segment may deform the insulation film as well, and thin the insulating film accordingly. The thickened portion provided in a wire segment does not contact the thickened portion in the wire segment adjacent thereto, which may avoid contact between the portions where the insulating film is thinned by deformation, and reliably ensure insulation between the wire segments adjacent in the pitch direction.

In the method disclosed herein, the at least one thickened portion may be formed while the flat wire is being wound. Such a configuration enables the at least one thickened portion to be formed simultaneously with the flat wire being wound, such that an increase in number of steps of manufacturing the reactor may be suppressed.

EMBODIMENTS

First Embodiment

Figure 2:
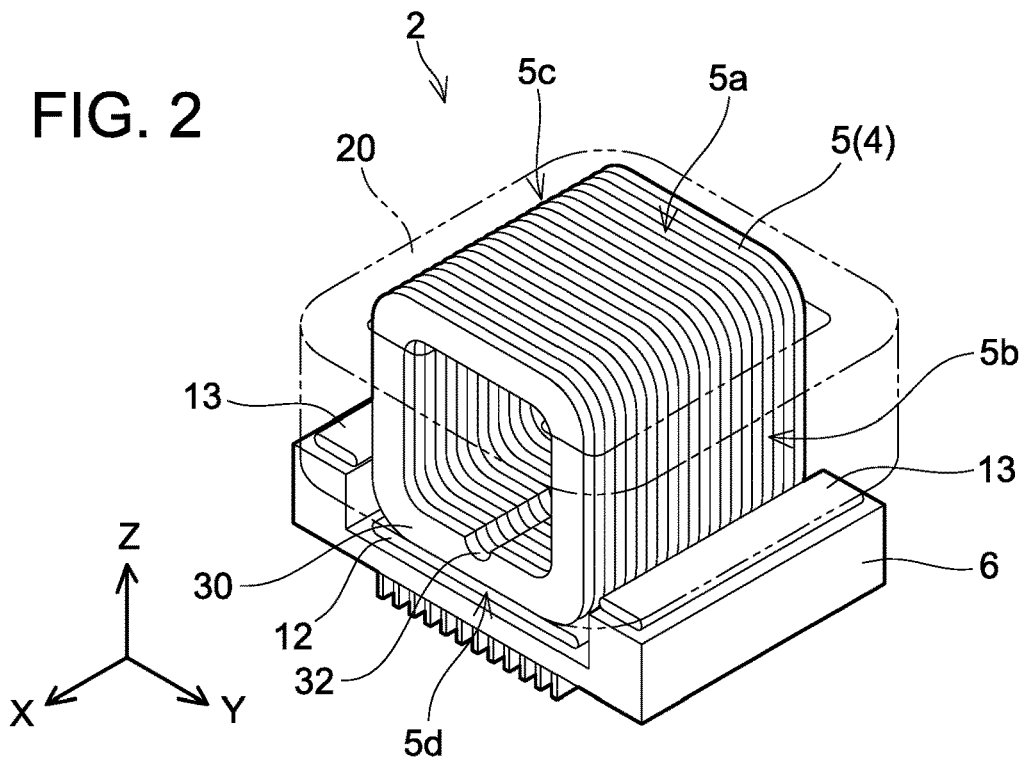
FIG. 2 is a perspective view of the reactor manufactured with the manufacturing method according to the first embodiment, with a core and a resin cover removed therefrom.
Figure 3:
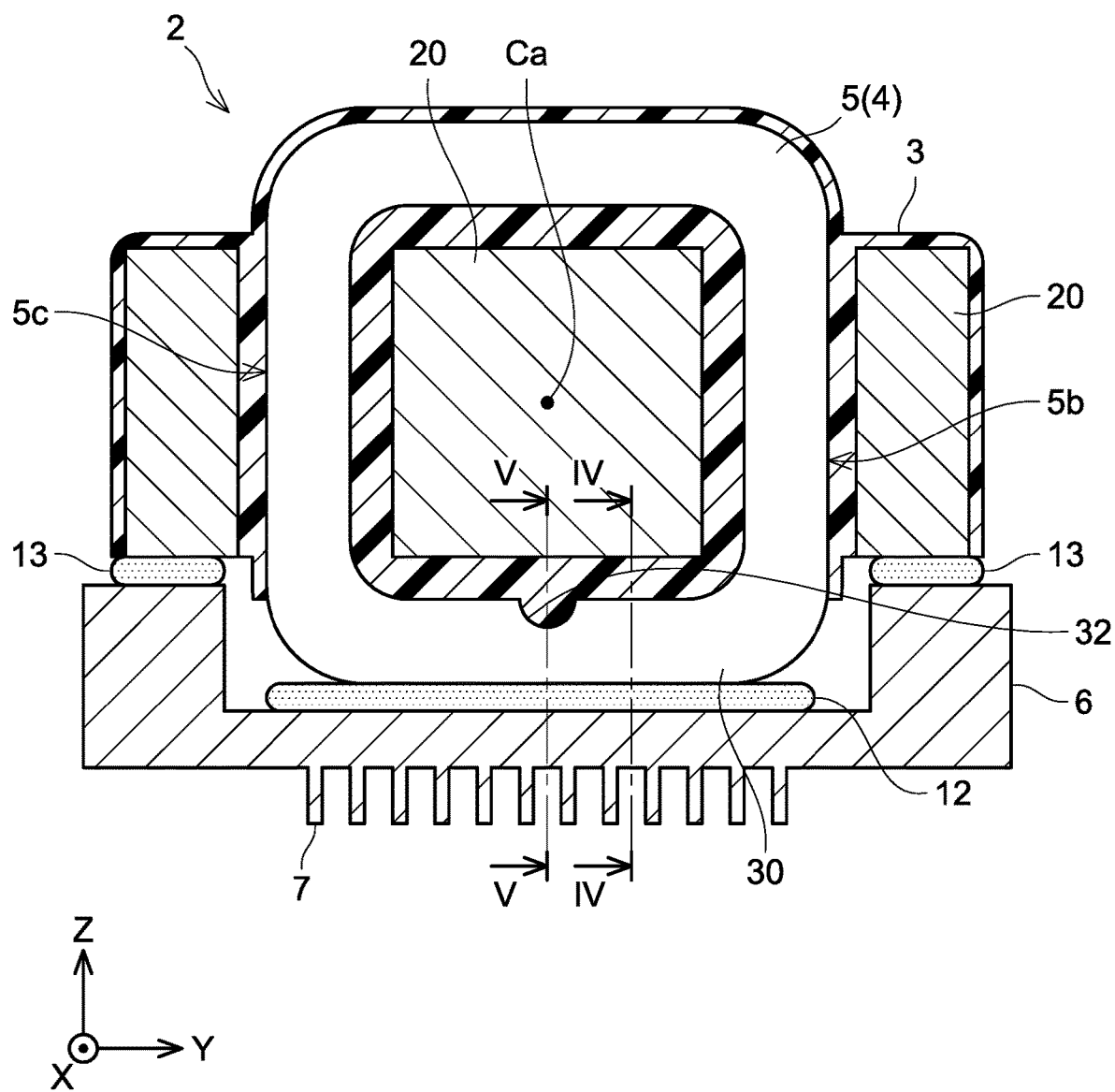
FIG. 3 is a cross-sectional view taken along a line III-III of FIG. 1.

A method of manufacturing a reactor 2 according to a first embodiment will hereinafter be described. Firstly, a configuration of the reactor 2 manufactured in the present embodiment will be described. FIG. 1 shows a perspective view of the reactor 2. The reactor 2 is a passive element comprising a core 20 and a coil 5 wound around the core 20. In FIG. 1, the core 20 and the coil 5 are covered with a resin cover 3, and are invisible. The reactor 2 is used for a chopper-type boost converter mounted on, for example, an electric vehicle. A traction motor of the electric vehicle has an output capacity of tens of kilowatts, and tens of kilowatts of power flows in the coil 5 of the reactor 2. The coil 5 allows large power to flow therein and thus generates a large amount of heat. The reactor 2 thus comprises a cooler 6. FIG. 2 shows a perspective view of the reactor 2 with the resin cover 3 and the core 20 removed. FIG. 3 shows a cross-sectional view taken along a line III-III of FIG. 1. In FIG. 2, the core 20 is depicted by phantom lines.

With reference to FIGS. 2 and 3, the structure of the reactor 2 will be described. The coil 5 is formed of a flat wire 4 wound into a prism shape. The coil 5 comprises the flat wire 4 wound edgewise. Edgewise means a way to wind a flat wire with its wider surface oriented toward an axial direction of the coil. The axial direction of the coil is a direction along which a coil axis extends, and is an X direction of a coordinate system in the drawings.

The coil 5 has a quadrangular prism shape, and has four flat side surfaces. The "flat side surfaces of the coil 5" mean flat surfaces parallel to an axis Ca of the coil 5. For convenience of description, a flat side surface oriented toward a +Z direction in the coordinate system in the drawings is termed an upper surface 5a, and a flat side surface oriented toward a −Z direction is termed a lower surface 5d. A flat side surface oriented toward a +Y direction is termed a right side surface 5b, and a flat side surface oriented toward a −Y direction is termed a left side surface 5c. The coil 5 has thickened portions 32 formed therein. The thickened portions 32 will be described later in details.

The cooler 6 faces the lower surface 5d of the coil 5 with an insulating heat dissipation layer 12 interposed therebetween. In other words, the lower surface 5d of the coil 5 thermally contacts the cooler 6 with the insulating heat dissipation layer 12 interposed therebetween. A lower surface of the core 20 thermally contacts the cooler 6 with an insulating heat dissipation layer 13 interposed therebetween. The cooler 6 has a lower surface provided with a plurality of fins 7. Although not shown, the lower surface of the cooler 6 faces a coolant passage, and the fins 7 are exposed to a liquid coolant.

The insulating heat dissipation layers 12, 13 are made of silicon rubber having heat tolerance and flexibility. Both the coil 5 and the cooler 6 are made of metal, and hence even when they directly contact each other, there still is a gap therebetween. To address this, the insulating heat dissipation layer 12, which has flexibility, is interposed between the coil 5 and the cooler 6 to aid heat transfer from the coil 5 to the cooler 6. The insulating heat dissipation layer 13 has the same purpose. Since the coil 5 generates heat, heat-transfer efficiency from the lower surface 5d of the coil 5 to the cooler 6 particularly influences cooling performance for the coil 5. High heat-transfer efficiency from the coil 5 to the insulating heat dissipation layer 12 is therefore desirable.

Figure 4:
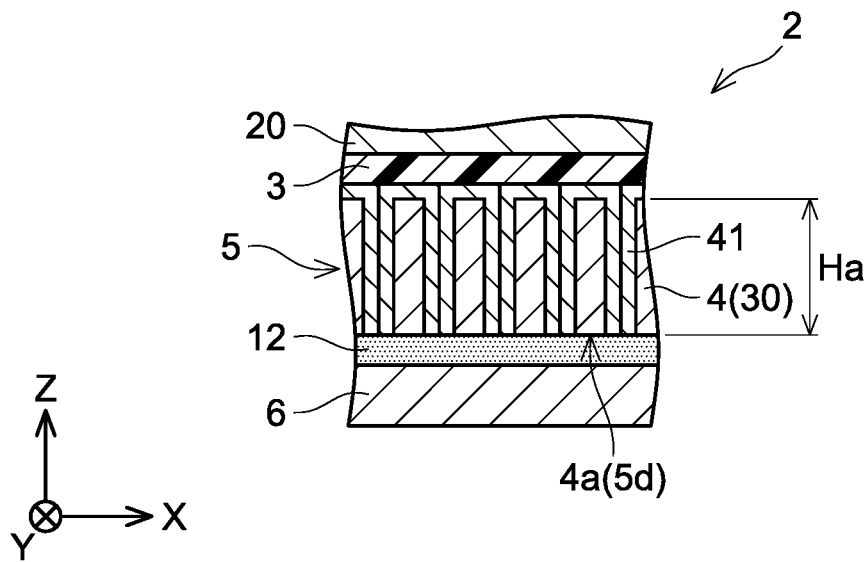
FIG. 4 is a cross-sectional view taken along a line IV-IV of FIG. 3.

FIG. 4 shows a part of a cross-sectional view taken along a line IV-IV of FIG. 3. The axis Ca of FIG. 3 extends parallel to an X axis of the coordinate system in the drawings. FIG. 4 is a partial cross-sectional view of a section that constitutes the lower surface 5d of the coil 5, and shows only a part of the coil 5 in a direction of the axis Ca. FIG. 4 is a cross-sectional view obtained by cutting the coil 5 at a portion where the thickened portions 32, which will be described below, are not formed.

Segments of the flat wire 4 that constitute the coil 5 as a whole are herein termed "wire segments 30". In other words, for convenience of description, the flat wire 4 that constitutes the coil 5 can be divided into a plurality of wire segments 30. The lower surface 5d of the coil 5 will be hereinafter described as being constituted of the plurality of wire segments 30 lying in the direction of the axis Ca (a pitch direction of the coil 5). The flat wire 4 of the coil 5 is covered with an insulating film 41 which ensures insulation between the wire segments 30 adjacent in the pitch direction. In FIG. 4, only the rightmost wire segment is assigned a reference sign 30 while reference signs for the other wire segments we omitted. The insulating film 41 is provided on all the wire segments 30. The insulating film 41 is typically an enamel coating.

The flat wire 4 is made of metal having high thermal conductivity, such as copper, whereas the insulating film 41 has thermal conductivity not so high as that of metal such as copper. To enhance the heat-transfer efficiency from the coil 5 to the insulating heat dissipation layer 12, the reactor 2 of the present embodiment is configured such that parts of the flat wire 4 (i.e., the wire segments 30) that contact the insulating heat dissipation layer 12 we not covered with the insulating film 41. Surfaces of the flat wire 4 not covered with the insulating film 41 are termed exposed surfaces 4a. A set of the exposed surfaces 4 of the flat wire 4 (the wire segments 30) constitutes the lower surface 5d of the coil 5. In other words, the exposed surfaces 4a of the flat wire 4 are surfaces corresponding to the lower surface 5d of the coil 5. In FIG. 4, only a part of the exposed surfaces is assigned a reference sign 4a. The insulating film 41 on the flat wire 4 is removed by grinding. Since the surface of the flat wire 4 that corresponds to the lower surface 5d is not covered with the insulating film 41, the copper flat wire 4 directly contacts the insulating heat dissipation layer 12. Heat-transfer efficiency from the flat wire 4 (the coil 5) to the insulating heat dissipation layer 12 is therefore enhanced.

Figure 5:
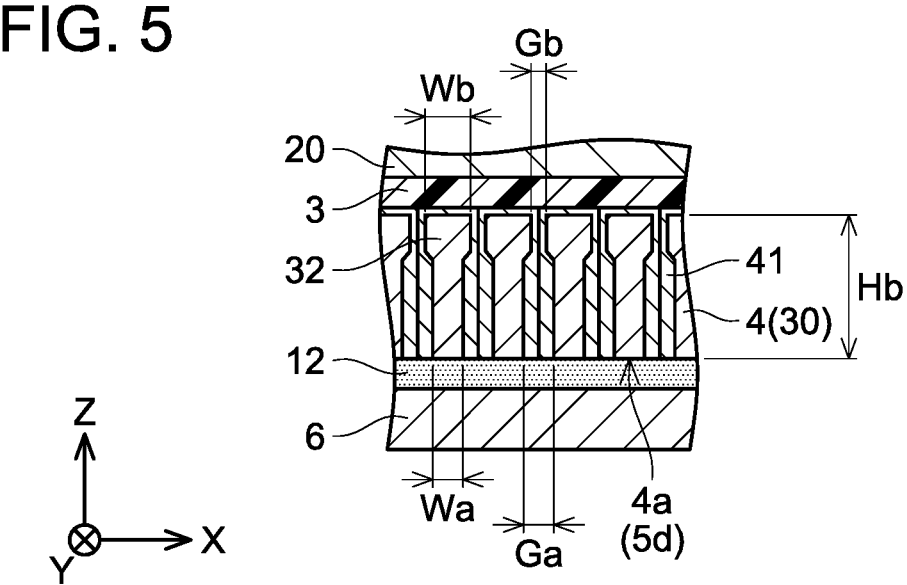
FIG. 5 is a cross-sectional view taken along a line V-V of FIG. 3.

Here, with reference to FIGS. 2, 3, and 5, the thickened portions 32 provided in the coil 5 will be described. FIG. 5 shows a part of a cross-sectional view taken along a line V-V of FIG. 3. The cross section of FIG. 5 corresponds to a cross section obtained by cutting the coil 5 at a plane including the axis Ca (see FIG. 3) of the coil 5. FIG. 5 is a partial cross-sectional view of a section of the coil 5 that constitutes the lower surface 5d, and shows only a part of the coil 5 in the direction of the axis Ca. FIG. 5 is a cross-sectional view obtained by cutting the coil 5 at a portion where the thickened portions 32 are formed.

As shown in FIGS. 2 and 3, the thickened portions 32 are provided at a surface of the flat wire 4 (i.e., wire segments 30) that is located on a lower surface 5d side (not on an upper surface 5a side) and located opposite to the lower surface 5d. In other words, the thickened portions 32 are provided in the wire segments 30 on an inner periphery side of the coil. The thickened portions 32 are provided at substantially centers of the wire segments 30 in their longitudinal direction (i.e., the Y direction). In the present embodiment, the thickened portions 32 are provided such that one of the thickened portions 32 is provided in each of the wire segments 30. The wire segments 30 have a length Ha (see FIG. 4) in a height direction (the Z direction) at the portion where the thickened portions 32 are not formed and a length Hb (see FIG. 5) in the height direction at the portion when the thickened portions 32 are formed, and the length Ha is larger than the length Hb. When the coil 5 is viewed along the direction of the axis Ca (i.e., viewed along the X direction), the thickened portions 32 respectively provided in the wire segments 30 are disposed at matching positions.

Each of the thickened portions 32 has its thickness increased in the direction of the axis Ca (the X direction). In details, as shown in FIG. 5, each of the wire segments 30 has a thickness Wb in the X direction at a height position where the thickened portion 32 is formed, and a thickness Wa in the X direction at a height position where the thickened portion 32 is not formed, and the thickness Wb is larger than the thickness Wa. Since the thickness Wb in the X direction at the height position where each of the thickened portions 32 is formed is larger, in each pair of the wire segments 30 adjacent in the axis Ca direction, the distance Gb between the thickened portions 32 is shorter while the distance Ga between the portions where the thickened portions 32 are not formed is longer. Due to this, the distance Ga, which is a certain amount of distance, can thereby be maintained between the portions of the wire segments 30 where the thickened portions 32 are not formed. Since each of the thickened portions 32 is provided on the inner periphery side of the coil, the distance Ga between the adjacent wire segments 30 on the outer periphery side of the coil is unlikely to decrease. This can suppress a decrease in the distance Ga between the adjacent wire segments 30 on their outer periphery side where the wire segments 30 are not covered with the insulating film 41, and thus avoid a short circuit.

Next, a method of manufacturing the reactor 2 according to the present embodiment will be described. The present embodiment is characterized in its step of forming the thickened portions 32 in the coil 5, and conventionally-known methods can be used for the other steps. Therefore, only characterizing parts of the present embodiment will hereinafter be described, and descriptions of the other steps will be omitted.

Figure 6:
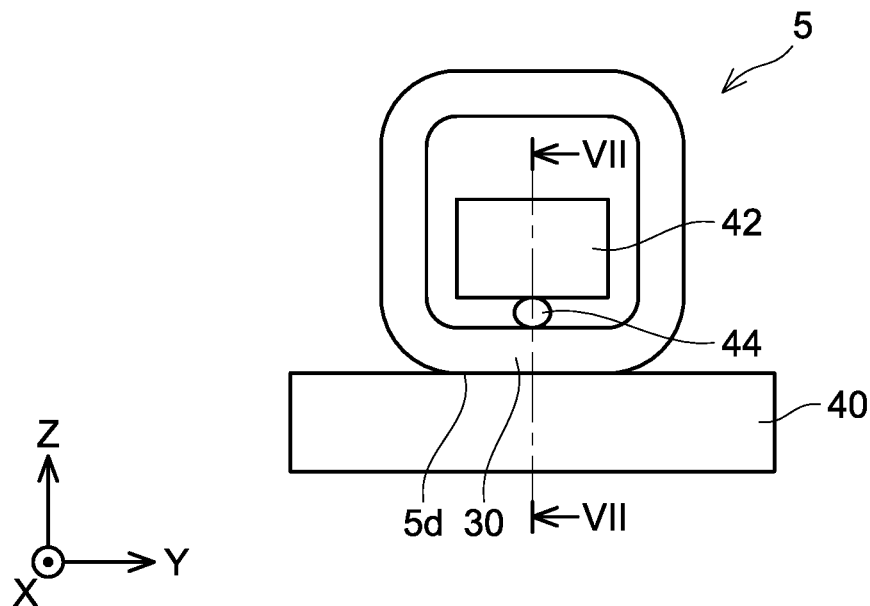
FIG. 6 is a diagram for describing the method of manufacturing the reactor according to the first embodiment.
Figure 7:
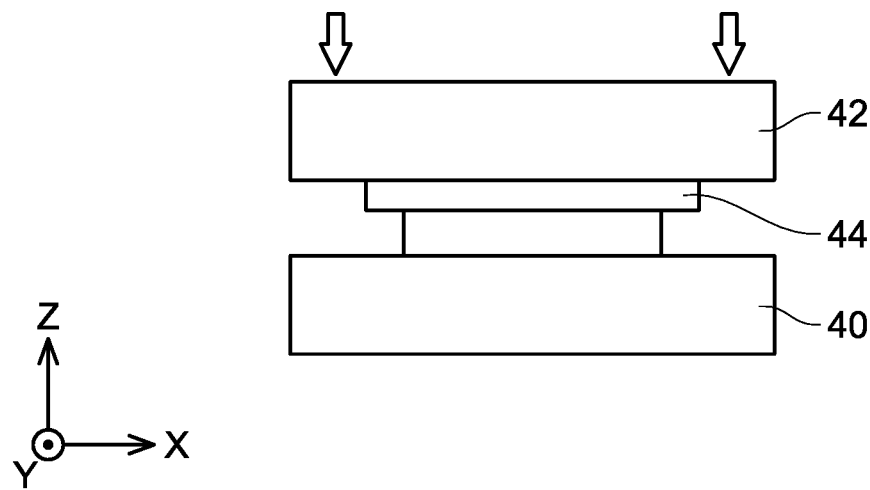
FIG. 7 is a cross-sectional view taken along a line VI-VI of FIG. 6.

The step of forming the thickened portions 32 is performed after a step of winding the flat wire 4 edgewise. As shown in FIG. 6, the coil 5 is firstly mounted on a platform 40 with its tower surface 5d oriented downward. Subsequently, a pin 44 is arranged on an inner periphery surface of the coil on the wire segments 30 including the lower surface 5d of the coil 5. The pin 44 is harder than the flat wire 4. The pin 44 extends along the axial direction of the coil 5 (the X direction) (see FIG. 7). The pin 44 is arranged at substantially the centers of the wire segments 30 in their longitudinal direction (i.e., the Y direction) (i.e., positions to form the thickened portions 32). Subsequently, a pressing jig 42 is arranged on the pin 44. Thereafter, as shown in FIG. 7, load is imposed on the pressing jig 42 to perform pressing. In other words, the pin 44 is pressed against a short side of the wire segments 30 on the inner periphery side of the coil so as to impose load thereon. The thickened portions 32 which are portions thickened in the axial direction of the coil 5 are thereby formed such that one of the thickened portions 32 is formed in each of the wire segments 30. With such a method, the thickened portions 32, all positioned at same positions when the coil 5 is viewed along the axial direction, can be formed at once in the wire segments 30.

Second Embodiment

In the first embodiment described above, the step of forming the thickened portions 32 is performed after the step of winding the flat wire 4. However, such a configuration is not limiting. For example, a step of forming the thickened portions 32 may be performed simultaneously with a step of winding the flat wire 4. In this case, the thickened portions 32 is formed such that one of the thickened portions 32 is formed in each of the wire segments 30 one by one.

As shown in FIG. g, in the winding step, edgewise processing jigs 50a to 50c are used to wind the flat wire 4 edgewise. Here, corners adjacent to each of the wire segments 30 including the lower surface 5d of the coil 5 in the longitudinal direction of the wire segments 30 are termed corners 4b, 4c. In the winding step, the flat wire 4 is to be wound edgewise to form the corner 4b and then be wound edgewise to form the corner 4c. In this case, each of the thickened portions 32 is formed after the flat wire 4 is wound edgewise to form the corner 4b and before the flat wire 4 is wound edgewise to form the corner 4c. Specifically, at a spot to form a thickened portion 32, a pin 54 is arranged on the inner periphery side of the coil, and a load-receiving jig 52 is arranged on the outer periphery side of the coil. Load is then imposed by an actuator (not shown) on the pin 54 from the inner periphery side to the outer periphery side of the coil (from right to left in FIG. g). With this method, the step of winding the flat wire 4 and the step of forming the thickened portions 32 in the wire segments 30 can be performed simultaneously, and an increase in number of steps in manufacturing the reactor 2 can be suppressed. Moreover, the method of the present embodiment allows one of the thickened portions 32 to be formed in one of the wire segments 30, and hence can decrease load to be imposed in comparison with the case where load is imposed at once on the plurality of wire segments 30 (i.e., the method of the first embodiment). This can decrease an output of a pressing device, and downsize the pressing device.

Third Embodiment

In the second embodiment described above, each of the thickened portions 32 is formed after the flat wire 4 is wound edgewise to form the corner 4b and before the flat wire 4 is wound edgewise to form the corner 4c. However, such a configuration is not limiting. For example, the thickened portions 32 may be formed simultaneously with the flat wire 4 being wound edgewise to form the or 4b.

Figure 9:
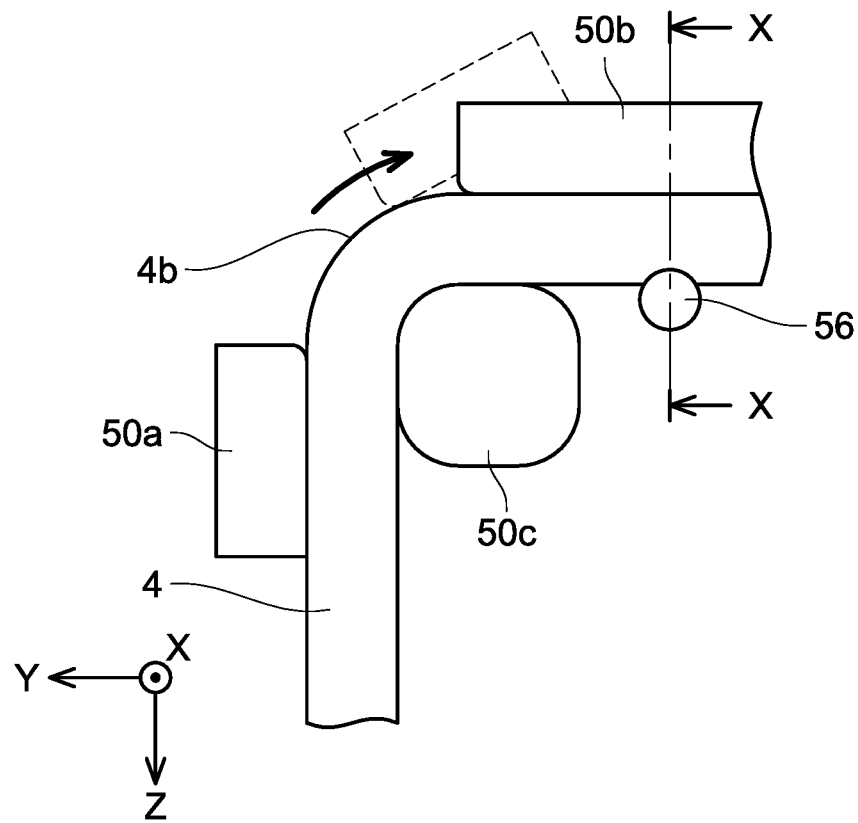
FIG. 9 is a diagram for describing a method of manufacturing a reactor according to a third embodiment.

As shown in FIG. 9, in a winding step, the edgewise processing jig 50b is moved along a winding direction (a direction of an arrow in FIG. 9). Although not shown in FIG. 9, a fixing jig 58 is disposed (see FIG. 10) on back surfaces (surfaces on a −X direction side in FIG. 9) of the flat wire 4, the edgewise processing jigs 50a to 50c, and a pin 56. Before the edgewise processing jig 50b is moved, the pin 56 is disposed at a target position where the thickened portions 32 (see FIG. 3) are to be formed after the win segments 30 have been wound (a position where the thickened portions 32 will be located after being formed by the pin 56). When the edgewise processing jig 50b is moved in this state, the flat wire 4 is wound edgewise, and additionally, the thickened portions 32 are formed in the flat wire 4 on the inner periphery side of the coil. At this occasion, the edgewise processing jig 50b also functions as a load-receiving jig while each of the thickened portions 32 is being formed. With this method, the step of winding the flat wire 4 and the step of forming the thickened portions 32 in the wire segments 30 can be performed simultaneously, and an increase in number of steps in manufacturing the reactor 2 can be suppressed. Moreover, each of the thickened portions 32 can be formed without the load-receiving jig 52 and the actuator for imposing load on the pin 54, which are used in the manufacturing method of the second embodiment described above.

Figure 10:
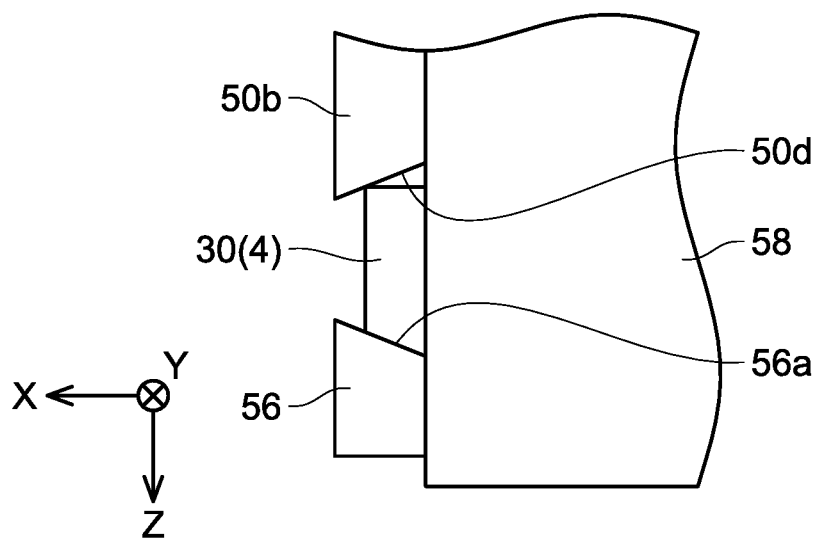
FIG. 10 is a cross-sectional view taken along a line X-X of FIG. 9.

The pin 56 and the edgewise processing jig 50b are opposed to each other, and have their opposing surfaces inclined toward each other. Specifically, as shown in FIG. 10, a surface 56a of the pin 56 that faces the flat wire 4 is angled, and more specifically, the surface 56a is angled to be closer to the edgewise processing jig 50b as it is farther away from the fixing jig 58. Similarly, a surface 50d of the edgewise processing jig 50b that faces the flat wire 4 is also angled to be closer to the pin 56 as it is farther away from the fixing jig 58. A kink of the flat wire 4 can thereby be suppressed while the flat wire 4 is being wound edgewise. Since the kink of the flat wire 4 is suppressed, each of the thickened portions 32 can be formed at a desired position and into a desired shape, and additionally, a forming load imposed thereon while each of the thickened portions 32 is being formed can be reduced.

Fourth Embodiment

Figure 11:
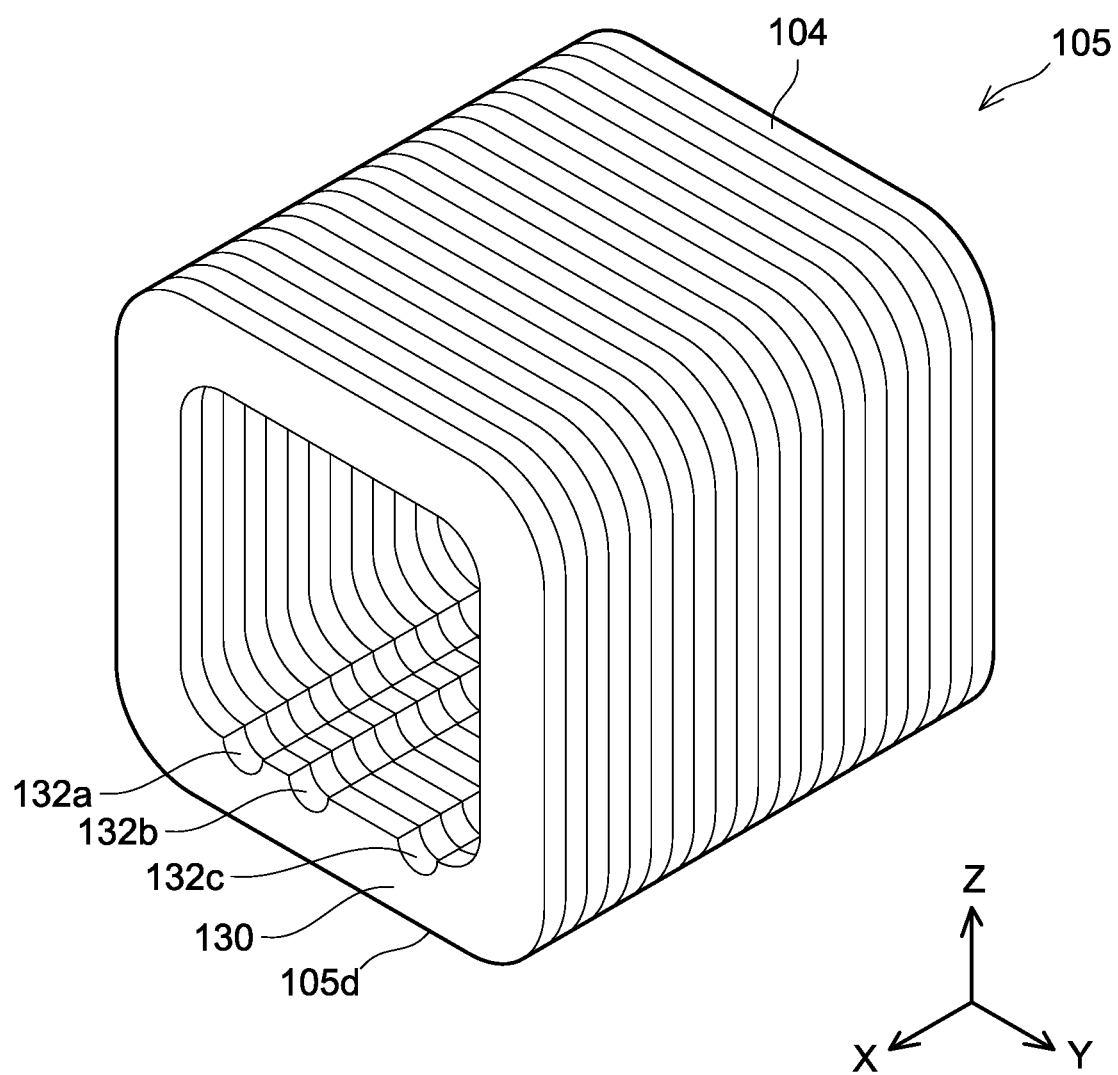
FIG. 11 is a perspective view of a coil included in a reactor manufactured with a manufacturing method according to a fourth embodiment.

In the first to third embodiments described above, one of the thickened portions 32 is formed in each of the wire segments 30 including the lower surface 5d of the coil 5 in the step of forming the thickened portions 32. However, such a configuration is not limiting. The number of the thickened portions formed in the step of forming the thickened portions 32 is not limited to particular values, and two or more thickened portions may be formed in each of the wire segments. With reference to FIG. 11, an example in which a set of three thickened portions 132a to 132c is formed in each of the wire segments 130 will be described.

At first, a reactor manufactured in the present embodiment will be described. The reactor manufactured in the present embodiment includes a coil 105 that differs from that of the reactor 2 of the first to third embodiments described above, and the other configurations are substantially the same. Therefore, only the coil 105 will be described, and other configurations may be omitted. Moreover, FIG. 11 shows only the coil 105, and does not show the other configurations of the reactor.

As shown in FIG. 11, a set of three thickened portions 132a to 132c is provided in each of the wire segments 130 of the coil 105. Specifically, the thickened portions 132a to 132c have the same shape, and are formed to align in a longitudinal direction of the wire segments 130 (i.e., the Y direction). A shape of the thickened portions 132a to 132c is the same as the shape of the thickened portions 32 (see FIG. 5) of the first embodiment described above, so the detailed description thereof will be omitted. The thickened portions 132b are provided at substantially centers of the wire segments 130 in its longitudinal direction (the Y direction). The thickened portions 132a are provided on a −Y direction side relative to the thickened portions 132b, and the thickened portions 132c are provided on a +Y direction side relative to the thickened portions 132b. The thickened portions 132a provided in the wire segments 130, respectively, are disposed at same positions when the coil 105 is viewed along the axial direction (i.e., viewed along the X direction). Moreover, the thickened portions 132b provided in the wire segments 130, respectively, are also disposed at same positions when the coil 105 is viewed along the axial direction (the X direction), and the thickened portions 132c provided in the wire segments 130, respectively, are also disposed at same positions when the coil 105 is viewed along the axial direction (the X direction).

Next, a step of forming the above-described thickened portions 132a to 132c will be described. When the thickened portions 132a to 132c are to be formed, the step of forming the thickened portions 32 of the first embodiment described above (see FIGS. 6 and 7), the step of forming the thickened portions 32 of the second embodiment described above (see FIG. g), or the step of forming the thickened portions 32 of the third embodiment described above (see FIGS. 9 and 10) can be applied.

A case where the step of forming the thickened portions 32 of the first embodiment described above (see FIGS. 6 and 7) is applied will be described. In this case, three rows of the thickened portions 132a to 132c are successively formed in a coil that has undergone the step of winding the flat wire 4. Specifically, first the row of the thickened portions 132b, then the row of the thickened portions 132a, and lastly the row of the thickened portions 132c are formed. When the row of the thickened portions 132b is to be formed, the pin 44 is arranged at substantially the centers of the wire segments 130 in their longitudinal direction (i.e., the Y direction) (i.e., positions to form the thickened portions 132b), and is pressed thereon. Since the step of forming the row of the thickened portions 132b is the same as the step of forming the thickened portions 32 of the first embodiment, the detailed description thereof will be omitted. Subsequently, the pin 44 is arranged at positions on the wire segments 130 on the −Y direction side relative to the thickened portions 132b (i.e., positions to form the thickened portions 132a), and is pressed thereon. The row of thickened portions 132a is thereby formed. Furthermore, the pin 44 is arranged at positions on the wire segments 130 on the +Y direction side relative to the thickened portions 132b (i.e., positions to form the thickened portions 132c), and is pressed thereon. The row of thickened portions 132c is thereby formed. The step of forming each row of the thickened portions 132a, 132c differs from the step of forming the thickened portions 32 of the first embodiment in the positions to dispose the pin 44, and the other configurations are the same, so the detailed description thereof will be omitted. As such, the three rows of thickened portions 132a to 132c are successively formed. An order of forming the three rows of thickened portions 132a to 132c is not limited to particular one, and these rows of thickened portions may be formed in a different order. Moreover, three pins 44 may be respectively arranged at three spots, namely, the position to form the row of thickened portions 132a, the position to form the row of thickened portions 132b, and the position to form the row of thickened portions 132c, and be pressed respectively thereon. In this case, the three rows of thickened portions 132a to 132c can be formed at once simultaneously.

Figure 8:
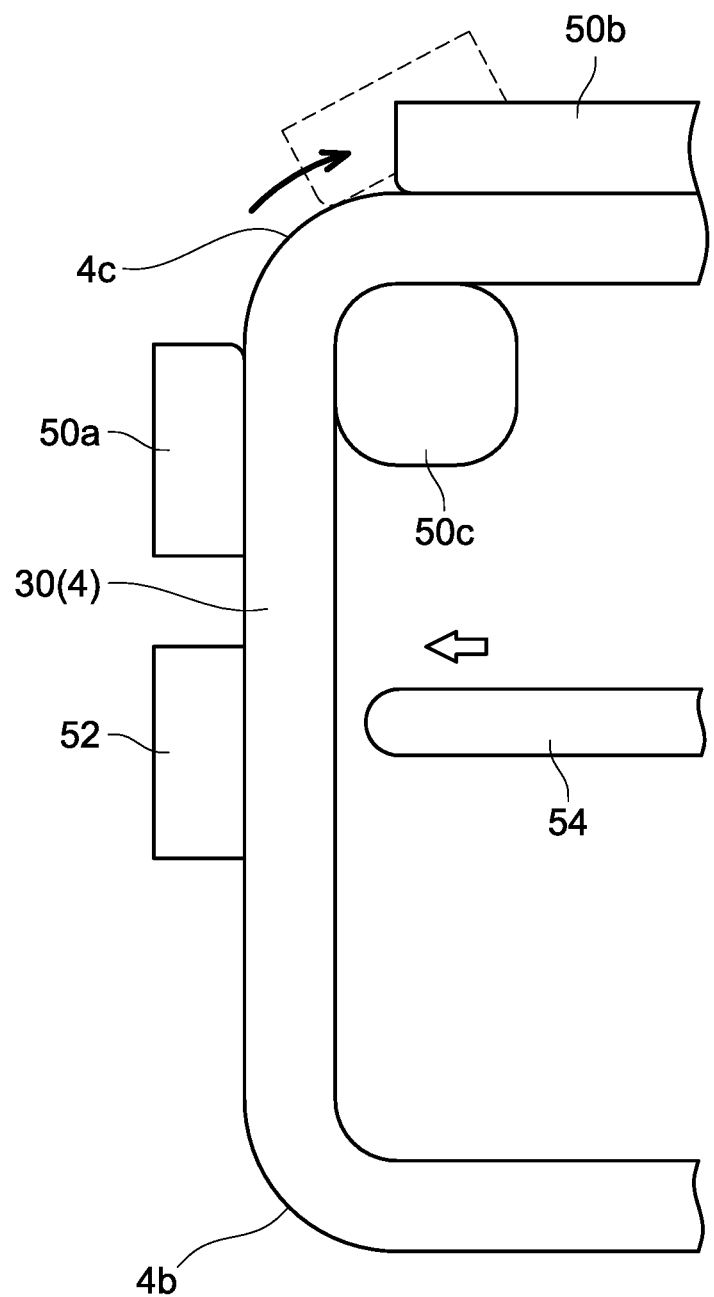
FIG. 8 is a diagram for describing a method of manufacturing a reactor according to a second embodiment.

Next, a case where the step of forming the thickened portions 32 of the second embodiment described above (see FIG. 8) is applied will be described. In this case, each set of the three thickened portions 132a to 132c is formed after the flat wire 4 is wound edgewise to form the corner 4b and before the flat wire 4 is wound edgewise to form the corner 4c. The step of forming each set of the thickened portions 132a to 132c differs from the step of forming each of the thickened portions 32 of the second embodiment in positions to dispose the pin 54 and the load-receiving jig 52, and the other configurations are the same, so the detailed description thereof will be omitted. An order of forming the three thickened portions 132a to 132c in each set is not limited to particular one. The three thickened portions 132a to 132c in each set may be formed successively, with the positions to dispose the pin 54 and the load-receiving jig 52 being changed. Moreover, three pins 54 and three load-receiving jigs 52 may be used to form the three thickened portions 132a to 132c in each set simultaneously. Furthermore, if the three thickened portions 132a to 132c in each set are to be formed simultaneously, a load-receiving jig having a length covering the outer periphery side of the coil from the portion to form the thickened portion 132a to the portion to form the thickened portion 132c may be used.

Next a case where the step of forming the thickened portions 32 of the third embodiment described above (see FIGS. 9 and 10) is applied will be described. In this case, while the flat wire 4 is being wound edgewise to form the corner 4b, the three thickened portions 132a to 132c in each set is formed simultaneously. Specifically, three pins 56 are respectively disposed at target positions where the thickened portions 132a to 132c are to be formed after the wire segments 130 have been wound (positions where the thickened portions 132a to 132c will be located after being formed by the pins 56). Thereafter, the edgewise processing jig 50b is moved to form the corner 4b. This allows the flat wire 4 to be wound edgewise, and additionally, allows the thickened portions 132a to 132c in each set to be formed in the flat wire 4 on the inner periphery side of the coil.

When a plurality of (three in the present embodiment) thickened portions 132 is formed in each of the wire segments 130, spots at which the wire segments 130 adjacent in the axial direction of the coil 105 have a shorter distance therebetween (corresponding to the distance Gb in FIG. 5) are also plural. The wire segments 130 (i.e., the flat wire 4) are made of metal, and hence are less deformable than the insulating film 41. Therefore, providing the plurality of the thickened portions 132 in each of the wire segments 130 allows the adjacent wire segments 130 to have a shorter distance therebetween at the plurality of spots, such that the adjacent wire segments 130 can more easily be held substantially parallel.

Fifth Embodiment

Figure 12:
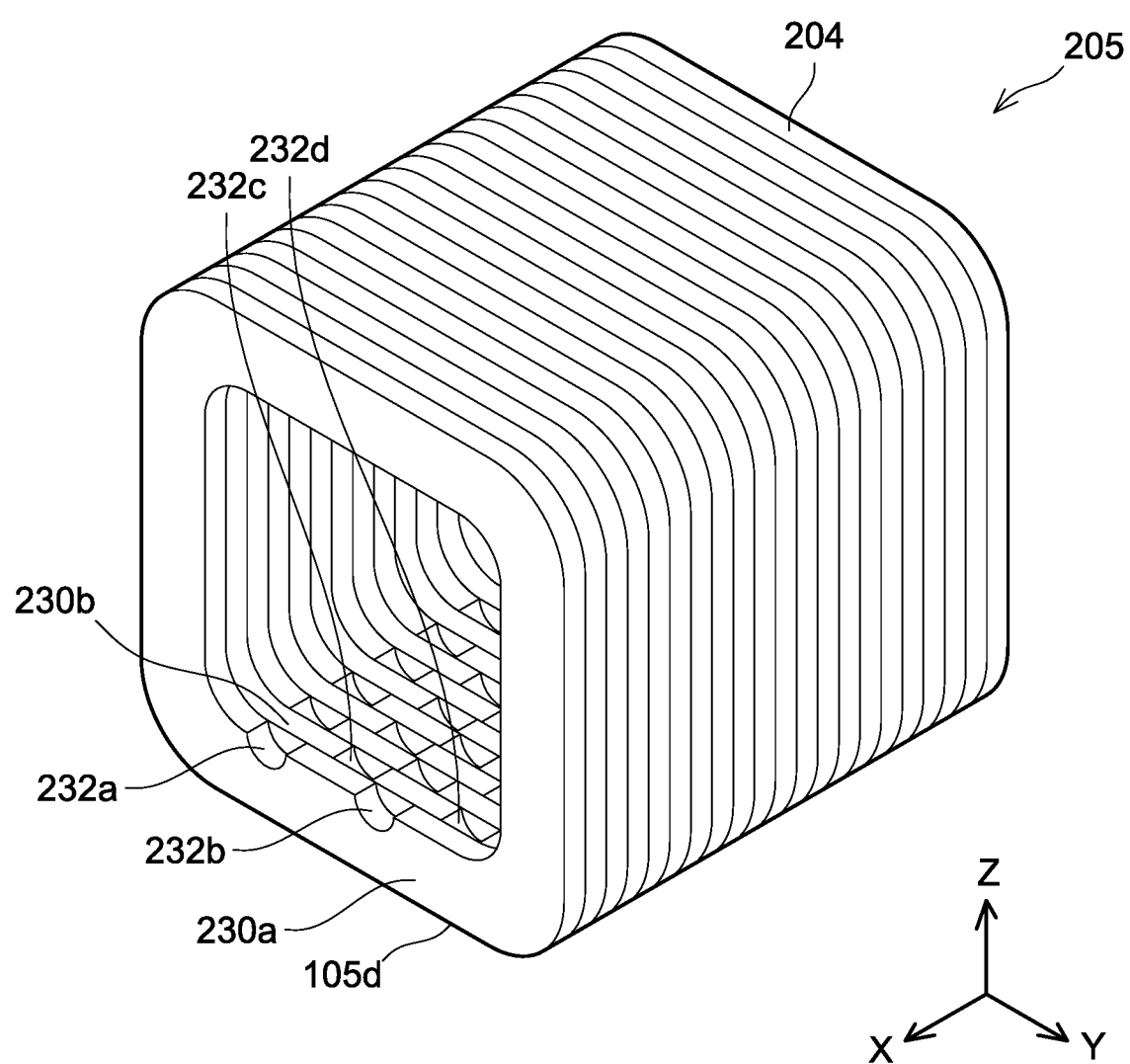
FIG. 12 is a perspective view of a coil included in a reactor manufactured with a manufacturing method according to a fifth embodiment.

In the step of forming the thickened portions 132 of the fourth embodiment, the plurality of the thickened portions 132 provided in each of the wire segments 130 is formed at the same positions when the coil 105 is viewed along the axial direction (the X direction). However, such a configuration is not limiting. The thickened portions may be formed at different positions when the coil is viewed along the axial direction. With reference to FIG. 12, a case where a plurality of thickened portions 232 to be provided in wire segments 230 adjacent in an axial direction of a coil 205 (the X direction) are formed at different positions when the coil 205 is viewed along the axial direction will hereinafter be described.

At first, a reactor manufactured in the present embodiment will be described. The reactor manufactured in the present embodiment includes a coil 205 which differs from that of the reactor 2 of the first to third embodiments described above, and the other configurations are substantially the same. Therefore, only the coil 205 will be described, and descriptions of other configurations will be omitted. Moreover, FIG. 12 shows only the coil 205, and does not show the other configurations of the reactor.

As shown in FIG. 12, two of the thickened portions 232 are provided in each of the wire segments 230 of the coil 205. Here, two of the thickened portions 232 provided in a wire segment 230a located most frontward (on the +X direction side) in FIG. 12 are termed thickened portions 232a, 232b sequentially from the −Y direction side, and two of the thickened portions 232 provided in a wire segment 230b adjacent to the wire segment 230a are termed thickened portions 232c, 232d sequentially from the −Y direction side. Although only the wire segments 230a, 230b adjacent to each other will hereinafter be taken as an example for description, the other wire segments 230 of the coil 205 have similar configurations.

When the coil 205 is viewed along the axial direction, the thickened portion 232a provided in the wire segment 230a is disposed at a position different from the positions of the thickened portions 232c, 232d provided in the wire segment 230b. The thickened portion 232b provided in the wire segment 230a is also disposed at a position different from the positions of the thickened portions 232c, 232d provided in the wire segment 230b. The thickened portion 232a provided in the wire segment 230a therefore is next to a portion of the wire segment 230b where the thickened portions 232c, 232d are not formed via the insulating film 41, and is not next to the thickened portions 232c, 232d. Moreover, the thickened portion 232b provided in the wire segment 230a also is next to a portion of the wire segment 230b where the thickened portions 232c, 232d are not formed via the insulating film 41, and is not next to the thickened portions 232c, 232d.

Next, a step of forming the above-described thickened portions 232a to 232d will be described. In the coil 205, the thickened portions 232a to 232d formed in the wire segments 230a, 230b adjacent to each other are disposed at different positions when the coil 205 is viewed along the axial direction. Therefore, the method of forming the thickened portions 32 in the wire segments 30 at once after the step of winding the flat wire 4 (sec FIGS. 6 and 7), which has been described in the first embodiment as above, cannot be applied. Therefore, when the thickened portions 232a to 232d are to be formed, the step of forming the thickened portions 32 described in the second embodiment (see FIG. g) or the step of forming the thickened portions 32 described in the third embodiment (see FIGS. 9 and 10) is applied. The step of forming the thickened portions 232a to 232d, to which the step of forming the thickened portions 32 of the second or third embodiment described above is applied, differs from the case where the step of forming the thickened portions 32 of the second or third embodiment is applied to the fourth embodiment, in the positions where the thickened portions 232a to 232d are formed on the wire segments 230a, 230b, and the other configurations are the same. Therefore, the detailed description thereof will be omitted.

As described above, the thickened portions 232 are formed by applying the step of forming the thickened portions 32 of the second or third embodiment. In other words, the thickened portions 232 are formed by pressing. The insulating film 41 that covers each of the thickened portions 232 may therefore be deformed by the pressing, and the insulating film 41 may accordingly be thinned. In the present embodiment, since the thickened portions 232a, 232b formed in the wire segment 230a, and the thickened portions 232c, 232d formed in the wire segment 230b adjacent to the wire segment 230a are disposed at different positions when the coil 205 is viewed along the axial direction, the thickened portions 232a, 232b and the thickened portions 232c, 232d are not next to each other. Therefore, even if the insulating film 41 that covers the thickened portions 232a to 232d has thinned portions, such thinned portions of the insulating film 41 being next to each other is avoided. This can suppress a short circuit.

In the first to fifth embodiments described above, the flat wire 4 is wound edgewise. However, such a configuration is not limiting. For example, the flat wire 4 may be wound flatwise, namely, with its wider surface oriented to face the coil axis.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A method of manufacturing a reactor which comprises:
a coil comprising a wound flat wire, the flat wire being covered with an insulating film, and the coil having a flat surface; and
a cooler facing the flat surface,
wherein
the flat wire on an outer periphery side of the coil is not covered with the insulating film at the flat surface, and
the flat wire at the flat surface includes a plurality of wire segments lying in a pitch direction,
the method comprising pressing a rod against a short side of the plurality of wire segments on an inner periphery side of the coil to form at least one thickened portion in each of the plurality of wire segments, the thickened portion being a portion of the flat wire thickened in the pitch direction.

2. The method according to claim 1, wherein
the at least one thickened portion includes a plurality of thickened portions, and
the plurality of thickened portions is formed in at least one of the plurality of wire segments.

3. The method according to claim 1, wherein
the at least one thickened portion in each of the plurality of wire segments is at a different position from the at least one thickened portion in an adjacent wire segment when viewed along an axial direction of the coil.

4. The method according to claim 2, wherein
the at least one thickened portion in each of the plurality of wire segments is at a different position from the at least one thickened portion in an adjacent wire segment when viewed along an axial direction of the coil.

5. The method according to claim 1, wherein
the at least one thickened portion is formed while the flat wire is being wound.

* * * * *